(12) United States Patent
Kumar et al.

(10) Patent No.: US 7,149,738 B2
(45) Date of Patent: Dec. 12, 2006

(54) RESOURCE AND DATA ADMINISTRATION TECHNOLOGIES FOR IT NON-EXPERTS

(75) Inventors: Manoj Kumar, Yorktown Heights, NY (US); Mukesh Mohania, New Delhi (IN); Upendra Sharma, New Delhi (IN); Vishal S Batra, Noida (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/319,979

(22) Filed: Dec. 16, 2002

(65) Prior Publication Data

US 2004/0117407 A1 Jun. 17, 2004

(51) Int. Cl.
*G06F 17/30* (2006.01)

(52) U.S. Cl. .................. 707/9; 707/102; 709/224; 709/225; 715/743

(58) Field of Classification Search .................. 707/9, 707/100–102; 709/224–225; 715/734, 741, 715/743
See application file for complete search history.

(56) References Cited

U.S. PATENT DOCUMENTS

| | | | | |
|---|---|---|---|---|
| 5,797,128 | A * | 8/1998 | Birnbaum ................... | 707/5 |
| 6,327,618 | B1 * | 12/2001 | Ahlstrom et al. ........... | 709/223 |
| 6,484,261 | B1 * | 11/2002 | Wiegel ........................ | 713/201 |
| 6,826,609 | B1 * | 11/2004 | Smith et al. ................ | 709/225 |
| 2003/0107590 | A1 * | 6/2003 | Levillain et al. ............ | 345/736 |
| 2003/0110192 | A1 * | 6/2003 | Valente et al. .............. | 707/513 |
| 2004/0250112 | A1 * | 12/2004 | Valente et al. .............. | 713/200 |
| 2005/0010820 | A1 * | 1/2005 | Jacobson ..................... | 713/201 |

FOREIGN PATENT DOCUMENTS

EP 001061431 A2 * 12/2000

OTHER PUBLICATIONS

Nicodemos Damianou, Naranker Dulay, Emil Lupu, Morris Sloman, "The Ponder Policy Specification Language", 2nd IEEE International workshop on Policies in Distributed System and Networks (POLICY 2001), pp. 18-38, 2001.

S. Chakravarthy and D. Mishra, "SNOOP: An Expressive Event Specification Language for Active Databases", Journal of Data and Knowledge Engineering, 13(3), pp. 1-26, Oct. 1994.

Stella Gatziu, Klaus R. Dittrich, "SAMOS: An Active Object-Oriented Database Systems", Active Rules in Database Systems (Norman W. Paton Eds), New York 1999, ISBN 0-387-98529-8, pp. 233-247.

A. Adi, D. Botzer, O. Etzion, T. Yatzkar-Haham, "Monitoring Business Processes through Event Correlation based on Dependency Model", ACM SIGMOD International Conference on Management of Data, 2001.

A. Adi, D. Botzer, O. Etzion, T. Yatzkar-Haham, "Push Technology Personalization through Event Correlation", 26th International Conference on Very Large Data Bases, pp. 643-645, 2000.

\* cited by examiner (Continued)

*Primary Examiner*—Khanh B. Pham
(74) *Attorney, Agent, or Firm*—Gibb I.P. Law Firm, LLC; Andrew P. Tennent, Esq.

(57) ABSTRACT

A system and method for managing data resources includes a policy definition layer, a policy deployment layer and a policy execution layer. The policy definition layer provides for creating, editing and visualizing policies through a user interface using intuitive simple language constructs. The policy deployment layer converts the created policies into a relational format that can be directly stored in a policy database. The policy execution layer executes the deployed policies on occurrence of an event. A resource abstraction and notification layer provides the interfacing of the resources with the policy definition layer, policy deployment layer and the policy execution layer.

22 Claims, 16 Drawing Sheets

Login Panel

User name: ☐
Password ☐

Submit   Reset

FIG. 5

Event Specification

Event name: _____ 702

Event Source: ● Internal  ○ External

Operator:  ● None
         ○ Any "n" events of the specified events
         ○ All of the specified events Event Type:
● Primitive
○ Composite Do you want to use existing events: [No ▽]

Event Type: [Database ▽] 704

Definition: [_____]

Department: [Citizen ▽]  Table: [EMPLOYEE ▽]

Action: [Insert ▽]  Fields: [ANY ▽]

[Clear]  [Append]  [Submit] 706

FIG. 7

Action Definition

Select Policy: [Database actions ▽]
- Notification
- Database actions
- Archival
- Purge Site: [Bombay ▽]  Department: [Citizen ▽]

Table: [EMPLOYEE ▽]  Operation: [Insert ▽]

Columns: [EMP_ID ▽]  [Append]

Values: [_____]  [Clear]

Columns: [EMP_ID ▽] [= ▽] [Append] Operator: [OR ▽]

Condition: [_____]  [Clear]

Action
Definition: [_____902_____]

[Clear]  [Append]—906  [Submit]—904

FIG. 9

Event Specification

Do you want to use existing events: [No ▷]

Event name: [New_temp]

Event occurs whenever there is : [Time ▷]

Event Source: ⦿ Internal  ○ External

Operator: ⦿ None
○ Any "n" events of the specified events
○ All of the specified events Event Type: [Temporal ▷]

Event is:
⦿ Primitive
○ Composite

[Clear]  [Append]  [Show event]  [Submit]

FIG. 11

Event Specification – Temporal event details

Starting from   Year   Month   Date   Hours   Minutes
                2002▷  Jan▷    1▷    9▷      00▷

Do Every    Month▷   Every month▷

At time   Hours   Minutes
          9▷      00▷           OR    On Interval of (Hours)   -▷

At date   1▷

Till    Year   Month   Date   Hours   Minutes
        2005▷  Jan▷    1▷    9▷      00▷

Event Definition:   (New_Temporal) (Starting From ( 2002-Jan-1  1:00 ) On  EveryMonth On Date 1 StartAt 9:00  EndAt ( 2005-Jan-1  1:00 ))

[Finish]   [Cancel]

FIG. 12

Condition Definition

Condition defined on: [Database_state ▽]

Location of the database: [DELHI ▽]

Database: [EBIZ ▽]

Table: [ - ▽]

Where Condition is: [Database Size▽] [Greater than ▽] [200] [MB ▽]

Logical Operator: [ - ▽]

Condition
Definition: [(database_state Size_of_database( DELHI:EBIZ) > 200 MB )]

[Clear]  [Append]  [Submit]

FIG. 13

Action Definition

Action Type: [Backup ▽]

Choose the location: [DELHI ▽]　　Choose the database: [Citizen ▽]

Storing location: [DELHI ▽]

Device: [Tape ▽]　　Backup the database as (database Name): [Backup_EBIZ]

Action Definition: [ [(Backup Database: DELHI:EBIZ At DELHI:Tape As Backup_EBIZ ) ] ]

[Clear]　[Append]　[Submit]

FIG. 14

RESOURCE AND DATA ADMINISTRATION TECHNOLOGIES FOR IT NON-EXPERTS

FIELD OF THE INVENTION

This invention relates to resource and data administration. More particularly, the invention provides a method and system for defining, deploying and executing policies in order to manage resources.

BACKGROUND OF THE INVENTION

A common problem faced by companies and institutions is the implementation of policies in order to manage resources in a computer network. A policy may be defined as a rule that defines the action(s) that are to be performed under certain condition(s) after occurrence of certain event(s). Thus, whenever there is an occurrence of an event, the system evaluates certain conditions corresponding to the event, and based on evaluation of these conditions, the system takes certain actions. This association of events, corresponding conditions, and corresponding actions are defined in a policy. An example of such a policy may be: when a person accesses database D1, and if the person is the administrator then provide full access to the person. In this case, event is a person accessing database D1, condition is checking whether the person is the administrator and action is providing full access.

In order to implement such policies, they need to be represented as instructions that can be executed by resource agents. Resource agent is software that resides with the resource and is responsible to evaluate resource specific condition and perform action by delegating right instructions to the resource. Examples of resources could be switches, routers, information repositories and other hardware and software components of a computer system. Such a system, which can accept and correspondingly act on policies, is called a policy based resource management system.

A comprehensive policy based resource management system correlates business policies with the overall actions of the system, in an organized manner. With such policy-based systems, enterprise managers can define policies that govern how a resource respond to applications and end users during specific times and resource conditions.

Definition of policy is a task that has assumed increased importance with rise in demand of applications accessing and transacting over distributed resources. The complexity of such applications has lead to increased complexity in distributed resource management and requires complex coordination among the resource administrators or IT managers. Moreover, different administrators might be responsible for maintaining different applications sharing the same resource. Such administration can lead to conflicting actions on the system. A conflict could arise if there are different (conflicting) actions defined for a particular event and condition. For example, if one administrator has defined action "Grant access to database D1" for an event X and condition Y, while another administrator has defined "deny access to database D1" for the same event and condition, then a conflict will arise. Hence, to manage resources and to avoid conflicts in distributed systems, highly skilled personnel and robust conflict detection schemes are required.

Several software tools and programming languages exist, which facilitate the definition and modification of policies for managing databases or other information repositories, some of which are listed hereinafter:

PONDER, a policy specification language, is one such tool. It has been described in the reference: Nicodemos Damianou, Naranker Dulay, Emil Lupu, Morris Sloman, "The Ponder Policy Specification Language", 2nd IEEE International workshop on Policies in Distributed System and Networks (POLICY 2001), pages 18–38, 2001. The Ponder language provides a common means of specifying policies relating to a wide range of management applications—network, storage, systems, application and service management. It supports condition-action rules (which are event triggered) for policy based management of networks and distributed systems. Ponder can also be used for security management activities such as registration of users or logging and auditing events.

SNOOP is another Event Specification Language for expressing active rules. It has been described in the reference: S. Chakravarthy and D. Mishra, "SNOOP: An Expressive Event Specification Language for Active Databases", Journal of Data and Knowledge Engineering, 13(3), pages 1–26, October 1994. SNOOP is an event specification language for describing events in centralized databases. Sentinel, an active database system, uses SNOOP. However, the user should have a good understanding of the language in order to define rules in Sentinel.

SAMOS (Swiss Active Mechanism-Based Object-Oriented Database System) is an active object oriented database system. SAMOS addresses rule (Event-Condition-Action rules) specification, rule execution and rule management. It has been described in the reference: Stella Gatziu, Klaus R. Dittrich, "SAMOS: An Active Object-Oriented Database Systems", Active Rules in Database Systems (Norman W. Paton Eds), New York 1999, ISBN 0-387-98529-8, pages 233–247.

Active Middleware Technologies (AMIT) is a software tool that makes applications reactive against situations. AMIT provides a language for defining metadata for situations, composed of primitive events, and actions. It also describes architecture for event handling, defining metadata for situations and action definitions, detecting desired events and taking actions on events. It has been described in the references: A. Adi, D. Botzer, O. Etzion, T. Yatzkar-Haham, "Monitoring Business Processes through Event Correlation based on Dependency Model", ACM SIGMOD International Conference on Management of Data, 2001 and A. Adi, D. Botzer, O. Etzion, T. Yatzkar-Haham, "Push Technology Personalization through Event Correlation", 26th International Conference on Very Large Data Bases, pages 643–645, 2000.

Although, the above-cited systems provide for definition of policies, they suffer from one or more of the following deficiencies. Firstly, the resource administrator needs to have a good understanding of the language in which policies are defined and also the underlying resources on which the policies act. Therefore, they do not facilitate the definition of policies by IT low skilled personnel. Secondly, most of them do not provide any mechanism for detecting conflicts between policies or rules at creation time.

Therefore, in light of the drawbacks associated with the existing policy definition systems, there is a need for an invention that provides for automation of administration tasks, thereby reducing the cost of resource and data administration. There is also need for an invention that allows IT low skilled or IT non-skilled personnel to handle resource management tasks effectively. A need also exists for a system that allows the visualization of policies for their intuitive and easy understanding. There is also a need for an invention that allows deployment of conflict free policies, defined by the user in an intuitive manner, into the policy database and subsequently converting them into rules for execution.

SUMMARY

An object of the current invention is to provide a system for enabling an IT non-skilled or IT low-skilled personnel to handle the resource management tasks effectively.

Another object of the current invention is to provide a system that allows easy definition and visualization of administration policies.

Yet another object of the current invention is to provide access control on individual policy artifacts (i.e., Event, Condition and Action).

A further object of the current invention is to provide a mechanism by which policy artifacts (Event, Condition and Action) can individually be associated to distributed resources and the same can be employed and processed under centrally managed policy execution apparatus.

The current invention provides a system for managing resources like databases, information repositories etc., for monitoring transactions and for transmitting data among systems. The system comprises a policy definition layer, a policy deployment layer and a policy execution layer. The policy definition layer provides for creating, editing and visualizing policies through a user interface using intuitive constructs. The policy deployment layer converts the created policies into a relational format that can be directly stored in a policy database. The policy execution layer executes the deployed policies on occurrence of an event. A resource abstraction and notification layer provides the interfacing of the resources with the policy definition layer, policy deployment layer and the policy execution layer.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 5 shows a GUI for authenticating a user prior to defining a policy, in accordance with a preferred embodiment of the current invention;

FIG. 7 shows a GUI for specifying events in accordance with a preferred embodiment of the current invention;

FIG. 9 shows a GUI for specifying actions in accordance with a preferred embodiment of the current invention;

FIGS. 11–14 depict a set of GUIs used in conjunction with an example in accordance with a preferred embodiment of the current invention;

DESCRIPTION OF PREFERRED EMBODIMENTS

Figure 1:
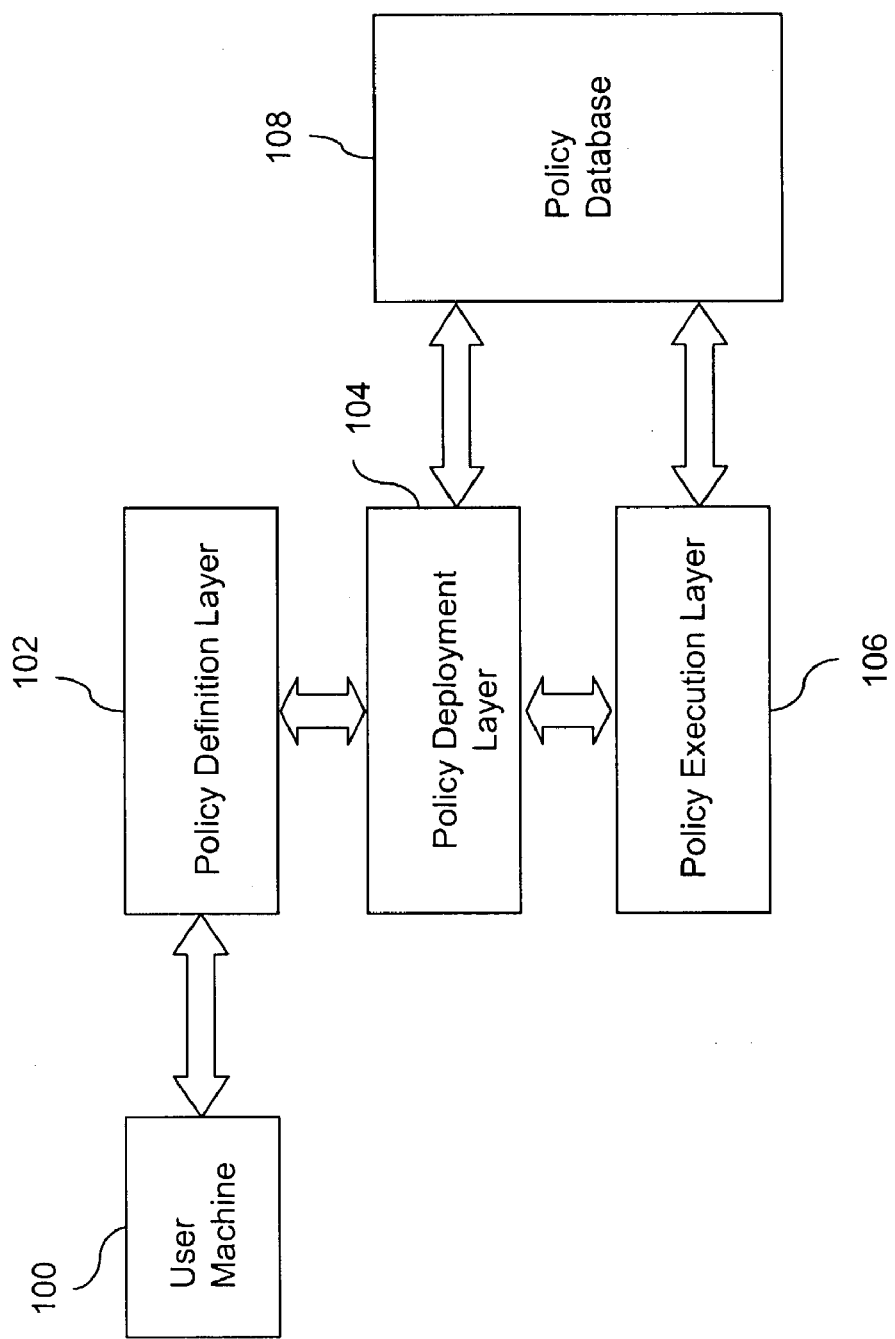
FIG. 1 gives an overview of a policy-based system and method in accordance with a preferred embodiment of current invention.

The current invention provides a user-friendly mechanism by which even an IT non-expert can define, modify and execute administrative tasks. The invention uses a flexible policy based mechanism for managing resources like databases, information repositories, application modules etc. The system can also be used for defining policies for transactions over different resources as well as for transmitting data among systems.

Policies comprise of event definitions, triggering conditions and the actions to be taken once the event has occurred and the corresponding condition has been satisfied.

Examples of polices can be:

Example Policy: Notify the local police inspector if there is a crime reported in a criminal database.

In this case, the action (notifying the local police inspector) is taken on occurrence of event (crime reported in a database).

Example Policy: At 9:00 AM on first day of every year, archive tax records if they are more than five years old provided no notice has been sent to the tax payer in the last five years.

In this policy, on occurrence of event (9:00 AM on first day of every year), records more than five years old are checked for the condition (no notice has been sent to the tax-payer in the last five years), and action is taken (archive the tax record).

Events, as illustrated in the above examples, can be defined to be an atomic entity, i.e., either it happens completely, or it does not happen at all. The event can be a primitive event, or a combination of primitive events, called composite events.

A primitive event is an event that cannot be broken down into further independent events. Primitive events can be of three types viz., database events, temporal events and events arising out of external notifications. Database events include Inserts, Delete, Access and Update operations on a database. Temporal events are events whose occurrence is time-dependent. External notifications are application-defined events. The external notifications are in the form of "interrupts" from the external environment, wherein the external environment consists of the domain excluding the native database (in which the insert, update and delete operations are performed).

Composite events can be defined through the use of logical operators such as OR, AND, ANY, NOT, TIMES, SEQUENCE on primitive events.

An example of a policy with a composite event is as follows: Whenever a person is hired in a company X (Event 1), and whenever the date of orientation program for new recruits is fixed (Event 2), then send that person an email informing him of orientation date (Action). Note that the condition is always true in this example policy.

The current invention also provides for policies relating to record retention and access control. Policies relating to record retention include defining policies that deal with inserting, updating and deleting records in databases and information repositories. An example of such a policy can be: whenever there is any addition of person entry in criminal database (Event), and the type of crime committed by that person is theft involving $ 50000 or more, then notify tax inspector about the same (Action).

Access control policies include policies relating to specifying access control on data, and on accessing resources. An example of such a policy can be—"Users belonging to finance section of a company can only access salary database and define policies relating to salary of employees". Access control can be at the level of event and/or condition and/or action. For example, a normal user (other than the system administrator) may not be granted permissions to define actions, which deletes policies created by another user.

The above examples of policies are merely to illustrate the kind of polices that can be defined in accordance with the current invention.

FIG. 1 gives an overview of a policy-based system and method in accordance with a preferred embodiment of the current invention. The system comprises a policy definition layer 102, a policy deployment layer 104 and a policy execution layer 106. Policy definition layer 102 provides for definition of policies in a user-friendly and intuitive manner. One way of achieving this is through use of graphical user interfaces (GUI). The GUIs use simple language constructs (in the form of drop down menus and clickable tabs), which do not require a user to have a good understanding of resources or the language used for managing the same. An example of a GUI that can be used in the current invention is an HTML page generated using Java Server Pages (JSP). The HTML page can be menu driven in such a way that the user can easily define the policies. The graphical user interfaces (GUIs), thus enables an IT non-expert to easily define policies to manage resources such as databases and other information repositories. The GUIs have used in the invention have been explained in conjunction with FIGS. 5–9.

Once the user has defined the policies, policy deployment layer 104 deploys these defined policies into a policy database 108. Prior to storing the policy in policy database 108, policy deployment layer 104 checks for any conflicts that might exist between the newly defined policy and the ones already existing in policy database 108 and stores only conflict free policies in policy database 108. The process of policy deployment is later explained in greater detail.

For every event that is occurring in the system, it is checked whether there exists a policy defined for that event in policy database 108. If a policy exists for that event, policy execution layer 106 executes the actions defined in the policy depending on the conditions specified in the policy. The process of policy execution is explained in greater detail in conjunction with FIG. 10.

Figure 2:
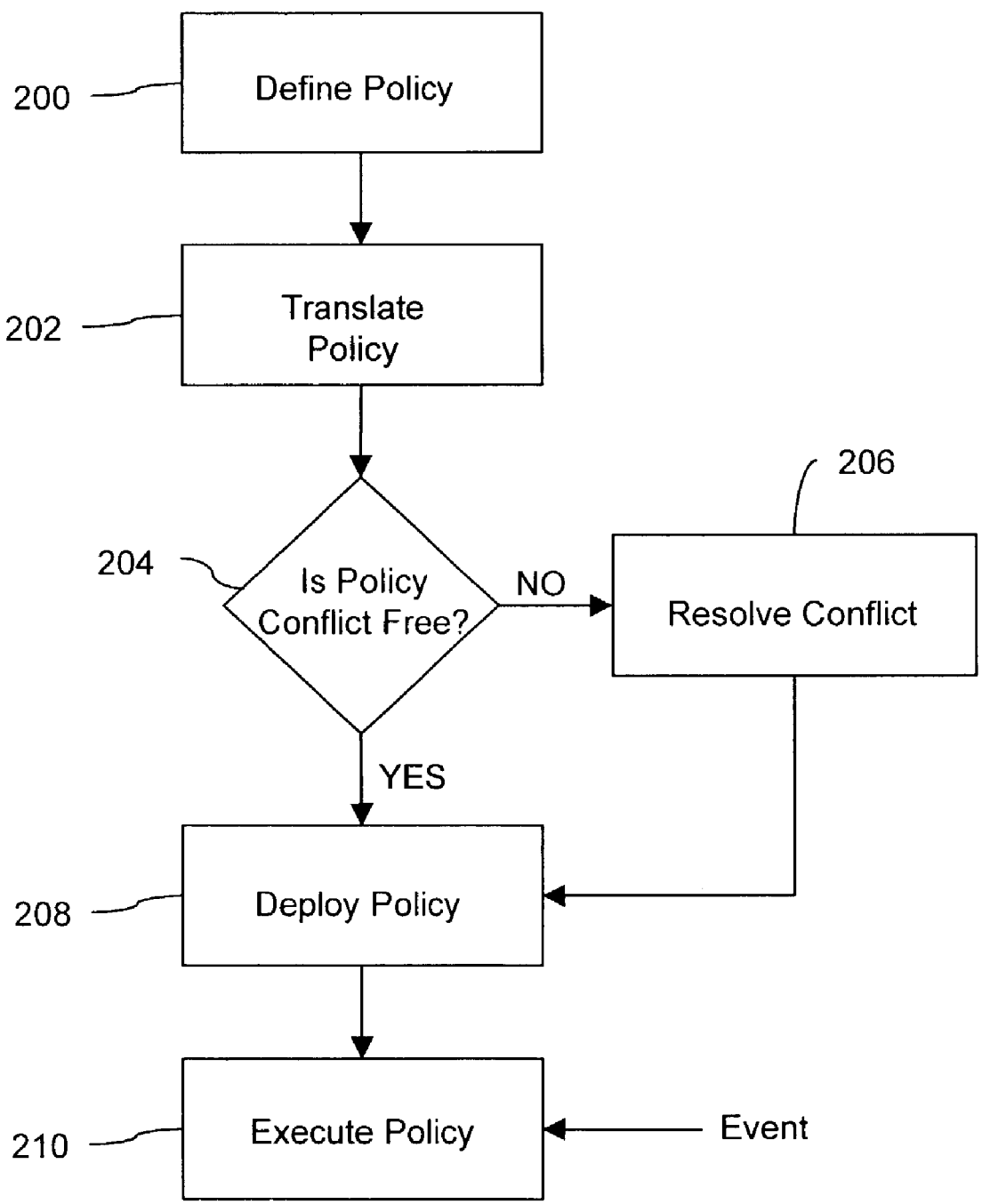
FIG. 2 shows a flowchart depicting the methodology for managing resources in accordance with a preferred embodiment of the current invention.

A flowchart broadly depicting the abovementioned process has been shown in FIG. 2. The user defines the policies at step 200, through a GUI, using simple language constructs. The policies are translated to system understandable format at step 202. Thereafter, at step 204, the system checks for any conflicts between the newly defined or modified policy and the policies already existing in the policy database. In case the newly defined or modified policy has a conflict, then, at step 206, the conflict is resolved. The exact manner in which policies are resolved will be explained later while discussing deployment in conjunction with FIG. 4. Conflict free policies are deployed in the policy database at step 208. Finally, on occurrence of an event, policies are executed at step 210, thereby managing the system resources.

Having given the overview, the environment in which the invention is implemented is now described in the following paragraph.

Figure 3:
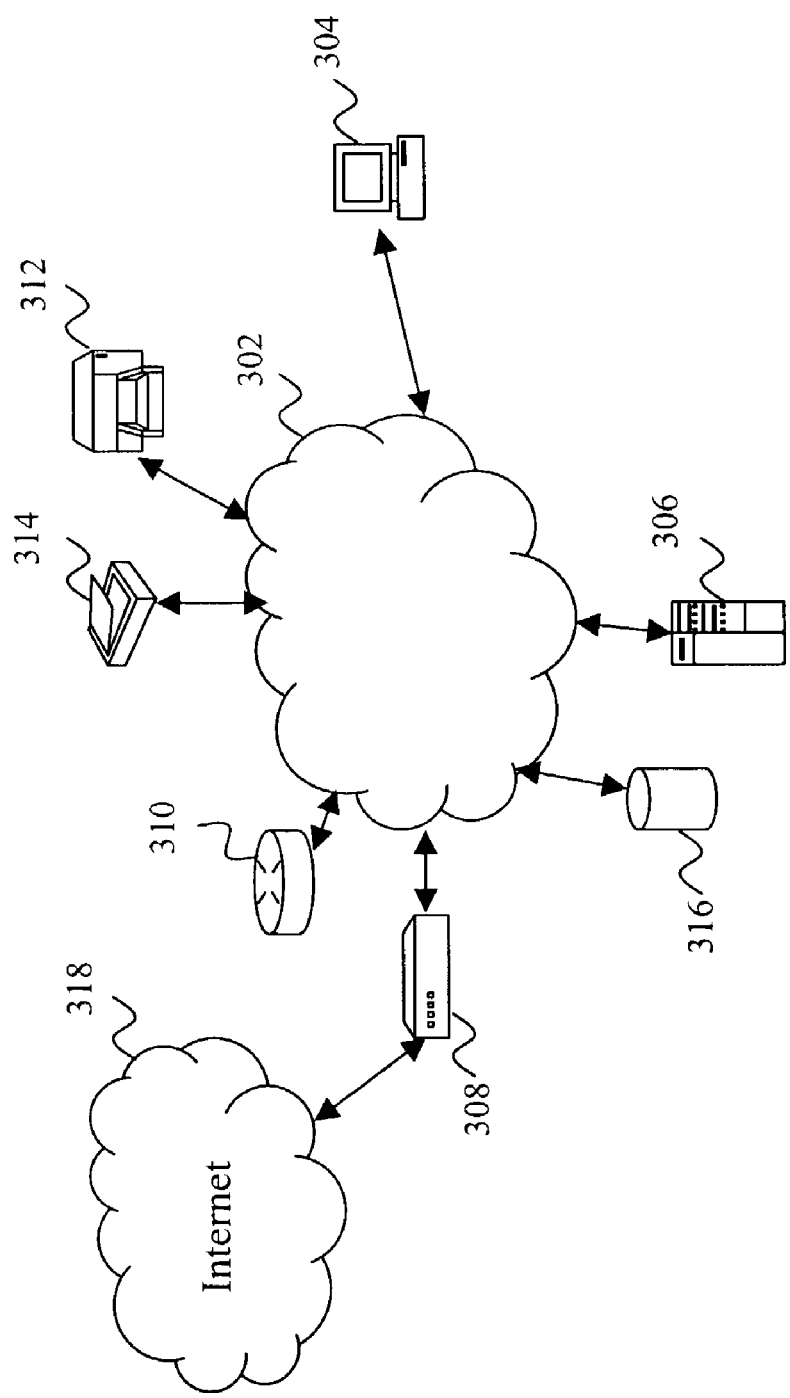
FIG. 3 shows a simplified diagram of a system showing various resources in accordance with a preferred embodiment of the current invention.

FIG. 3 shows a simplified diagram of a computer network managed by the policy-based system in which a preferred embodiment of the current invention is implemented. A network 302 is connected to a plurality of resources that need to be managed by the policy-based system. Resources include a plurality of entities such as end stations 304 and servers 306 interconnected by plurality of intermediate devices such as routers 308, switches and bridges 310. Resources such as printers 312, scanners 314, information repositories and databases 316 may also be attached to network 302. The network may also be connected to the Internet 318 to receive or provide any service to resources lying outside the network.

Having given the overview and the environment of the invention, the invention is now described in greater detail.

Figure 4:
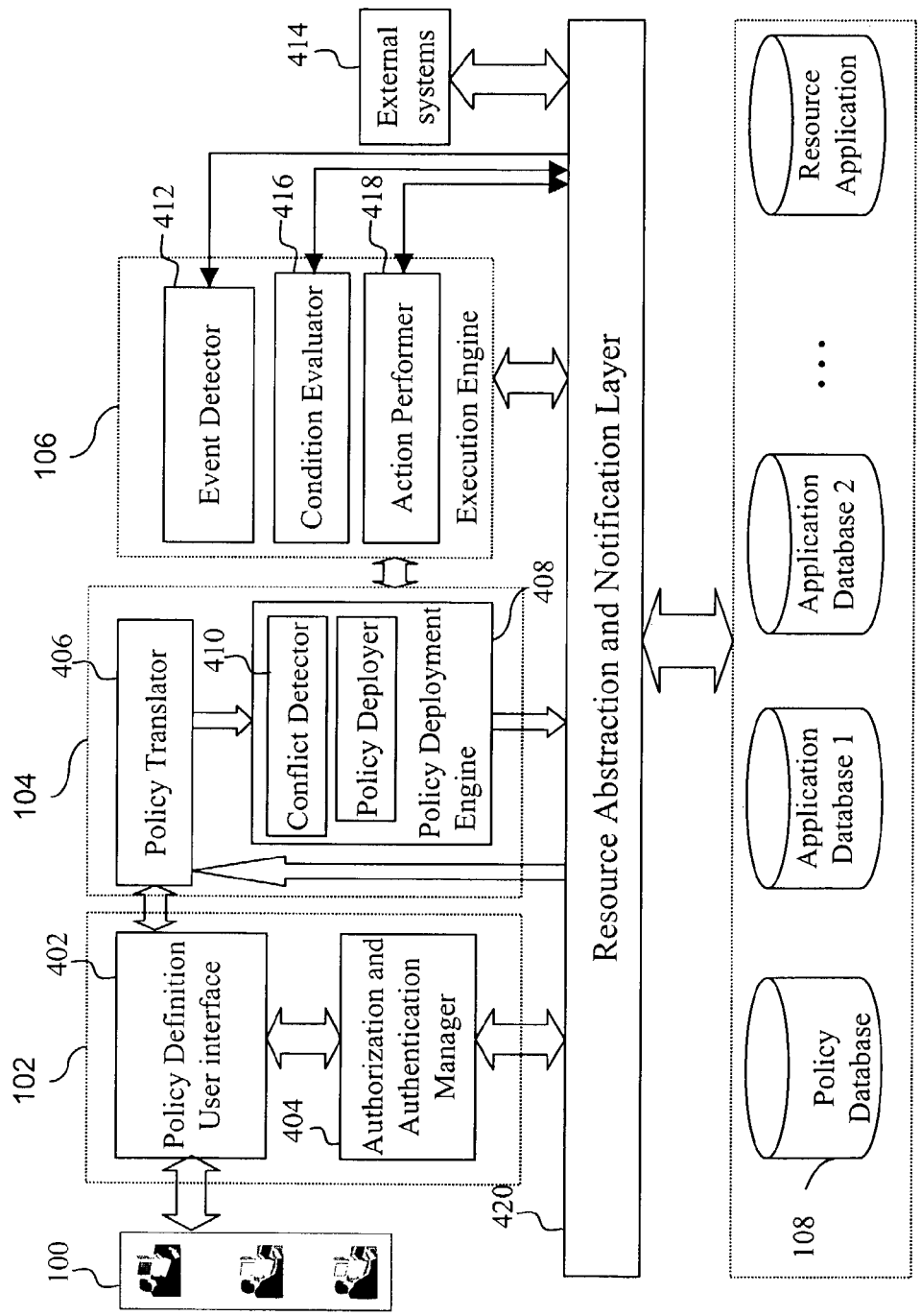
FIG. 4 shows a detailed representation of the layered architecture used for managing resources in a distributed environment in accordance with a preferred embodiment of the current invention.

FIG. 4 shows a detailed representation of the layered architecture used for managing resources in a distributed environment in accordance with a preferred embodiment of the present invention. The architecture comprises three layers, namely policy definition layer 102, policy deployment layer 104 and policy execution layer 106. Through this architecture, a user can perform various tasks such as resource registration, identification, and transaction management. Further, the layered approach makes it easier to follow object-oriented design principles. In a preferred embodiment, the three layers can be deployed on a single server instance.

The first layer or policy definition layer 102 has a policy definition user interface 402, which provides intuitive and simple user interfaces that enable a user to define policies in simple language constructs. This language provides a set of templates in which the values of variables and operators that are needed to form a valid policy, are obtained from the user by giving easy to use drop-down menu options on user interfaces. A direct one-to-one mapping between the policy templates and system commands can be specified in order to implement the policy definitions. This set of variables and operators in a policy language should adhere to the syntax defined in a meta-language (e.g. Data Dictionary or XML DTD). The meta language defines the association of operators with variables. For instance, greater than operator ('>') may be associated with numbers and not with strings. It may be noted that the above technique is just a simple example of developing policy templates based on the underlying system commands. One skilled in the art will appreciate that other techniques, such as specifying a separate grammar for building these templates, can also be used. Thus, the user interfaces provided to the user make the process of policy creation simple and less error prone, and requires minimal IT skills. A preferred manner of defining policies in an intuitive manner through the use of GUIs has been illustrated in conjunction with FIGS. 5–9.

Policy definition layer 102 also includes authorization and authentication manager 404, which provides single point access to user privileges and rights to access/modify application data. For example, any update in policy database 108 (for defining/modifying policies) requires authentication (to check if the user is a valid user) and checking user privileges (to check whether the user has been granted enough permissions for the transaction).

The second layer is policy deployment layer 104 that provides Application Programming Interfaces (APIs) for deploying these policies. It contains a policy translator 406 and a policy deployment engine 408. Policy translator 406 validates the policy definition provided by the user through policy definition layer 102. Policy translator 406 parses the policy definition provided to it by policy definition layer 102 (defined by the user using simple language through GUI). Thereafter, it extracts details regarding the policy artifacts, namely event details (such as event ID, event name, event owner etc.) and details regarding the condition and action defined on that event. The extracted details are later used by policy deployment engine 408 to store the defined policy in policy database 108. The exact manner in which they are stored is explained later, in conjunction with tables 1–5. Before storing the policies into policy database 108, conflict detector 410 checks for any conflict between the policies already present in policy database 108 and the newly created or modified policy. Policy translator is also used for retrieving policies stored in policy database 108, so that the user can modify and visualize existing policies.

Conflicts occur when for the same event and condition(s), conflicting actions are defined. To illustrate the concept of conflicts more clearly, consider the following example: consider a database having tax records of individuals that has information about the individual, tax paid, employer name, income tax rate applicable and other tax related information. Consider a policy P1, adopted by the tax department, wherein all tax records of an individual is to be purged, if they are five years old. Consider another policy P2, wherein the criminal department can have a policy of maintaining all financial records (including tax records) of an individual who has been involved in any financial crime, till the time all criminal cases related to her crime has been resolved. If the tax and criminal departments have not cooperated during defining these policies, then P1 and P2 will be in conflict for an individual, who has committed a financial crime, and against whom there are criminal cases pending from the last five years. In such a case, policy P1 will try to purge the individual's tax records, as soon as five years has passed, whereas policy P2 will try to maintain the individual's tax records till the completion of all criminal cases related to her crime has been resolved.

Such conflicts can be detected either at the stage when the policy is getting defined or when it is getting executed. In order to ensure detection and resolution of conflicts at the policy definition stage, meta-policies are defined in a preferred embodiment of the current invention. Meta-policies are a set of rules or constraints over policies. A responsible person such as a system administrator, who has good domain knowledge about resources and policies, defines meta-policies. For example, in the example stated above, the system administrator can define a meta-policy setting precedence of P2 over P1. In this manner, a constraint is imposed over policies and policy makers, thereby disallowing the simultaneous execution of two conflicting policies. In other words, meta-policies establish priority on operations on each resource object, and precedence between policy creators for each resource operation. Taking a general case of the example stated above, suppose there are two administrators AD1 and AD2, with AD1 being the main administrator. A meta-policy can be defined which says that the policies defined by AD1 have precedence over policies defined by AD2. Therefore, in case AD2 defines a policy which conflicts the policy defined by AD1, the meta-policy comes into force and, thus, policy defined by AD1 gets precedence over policy defined by AD2. One skilled in the art will appreciate that existing conflict detection schemes, especially those used for detecting and avoiding conflicts at run time, can be adapted to the current invention. Further details regarding conflict detection can be found in the reference papers—Sin Yeung Lee, Tok Wang Ling 'Refined Termination decision in active databases' DEXA 1997; and Sin Yeung Lee, Tok Wang Ling 'Unrolling cycles to decide trigger termination' VLDB 1999.

Conflict detector 410 checks for any conflicts the newly created or updated policy might have with the already existing policies in the policy database. In case of a conflict, it checks whether the new policy can be kept or not by checking the meta-policies in the policy database. For instance, in the above example if AD1 (administrator 1) creates a policy which is conflicting with policy defined by AD2 (administrator 2) stored in the policy database, then AD1's policy will be executed (since AD1 has priority over AD2). If AD2 creates a policy which is conflicting with already defined AD1's policy, then the resulting policy is not stored in the policy database, and an error message is returned to the user AD2. Policy deployment engine 408 thereafter stores the conflict free policy in policy database 108. In this manner, policy definition layer 102 and policy deployment layer 104 ensure storing of policies in policy database 108.

Resource abstraction and notification layer 420 provides a centrally managed system for accessing and monitoring resources. All events and transactions related to the resources are notified with the help of this layer. Policy definition layer 102, policy deployment layer 104 and policy execution layer 106, interact with resource abstraction and notification layer 420 to access policy database 108 and other internal and external resources. Resource abstraction and notification layer 420 helps in maintaining data consistency, by providing single point access for viewing, updating, deleting and inserting records in databases (including policy database). The layer allows transactions in databases only after authorization and authentication manager 404 has verified the authenticity and authorization of the user. The layer also helps in event detection by informing event detector 412 about all transactions and data changes in databases. The layer can be implemented by standard ODBC technology (such as JDBC used in Java platform).

Resource abstraction and notification layer 420 comprises of three modules viz., resource access and transaction management module, condition evaluator framework and action performer framework. Resource access and transaction management module interacts with different resources connected to the system. It can also interact with external applications. This module performs many functions such as listing the registered resources, executing resource query, listing a policy, adding new policy, deleting policy, updating policy and registering external resources by interacting with the database. The condition evaluator framework lists the registered condition evaluator components in the system. Since the layer is implemented on the principles of 'Plug and play', existing condition evaluators can be deleted, and additional conditional evaluators components may be added later with ease. The addition and deletion of conditional evaluator components is done by a responsible person such as a system administrator. The action performer framework is similar to conditional evaluation framework except that it lists registered action performer components and provides addition and deletion of the same.

Third layer is policy execution layer 106 that provides APIs for executing the policies deployed in the system. Event Detector 412 listens to Resource Abstraction and Notification Layer 420 for all events occurring in the system, and checks for events that are specified in the event table of policy database(explained later in detail in conjunction with tables 1–5 and FIG. 10). For each relevant event occurrence, the layer broadcasts events to respective event listeners (such as policy deployment layer 104 and condition evaluator 416) registered with the system. Resource abstraction and notification layer 420 informs event detector about the database transactions and data changes in the system. Events may be internal or external to the system. Internal events are events that occur due to any change in status of any component of the network. For example, an update operation in a local database is an internal event. External events relate to events that occur due to external systems 414 such as changes in outside temperature. On detecting an event, policy execution engine 106 searches for the required event identifier and the corresponding policy in policy database 108. Thereafter, condition evaluator 416 determines the condition associated with the event. In case of multiple conditions associated for a particular event, each condition may be evaluated concurrently. If the condition is evaluated to be true, conditional evaluator 416 notifies action performer 418 for action execution. Finally, on successful event detection and condition evaluation, action performer 418 executes the actions defined in the policy. Examples of actions that can be performed are mail notification (for sending e-mail), database transaction (inserting or updating a table in database such as logging activity), data archive and backup (performing data archiving and backup operations) etc. It is apparent to one skilled in the art that other types of actions can also be taken with out deviating from the scope of the invention. The process of policy execution is described in greater detail in conjunction with FIG. 10.

The mechanism for defining and storing policies in an intuitive manner will now be described with help of FIGS. 5–9 and tables 1–5. Although the mechanism has been illustrated with the help of GUI's, other manners, which provide an intuitive manner for defining of policies, can be used without deviating from the scope of the invention. The GUI for policy specification has three main screens, one for event specification, one for condition specification and one for action specification. Each screen is functionally complete for specifying the respective artifacts (i.e. event, condition or action) of the policy. Thus each artifact of the policy is treated as an atomic entity having no direct impact on the specification of any other artifact of the policy.

FIG. 5 shows an example of a GUI for authenticating a user prior to defining a policy, in accordance with a preferred embodiment of the current invention. The GUI handles the login and authentication of the policy creator. The access privilege associated with each login and the role is utilized to define the event, condition and action screens.

Once a user has logged on through the GUI for authentication, he/she is given a choice for one of the following options: define new policies, modify existing policies, delete existing policies and view existing policies; the choice depending on the access privileges. A GUI for providing the user with such an option has been depicted in FIG. 6. The user can choose the desired option be clicking on the desired hyperlink.

Figure 6:
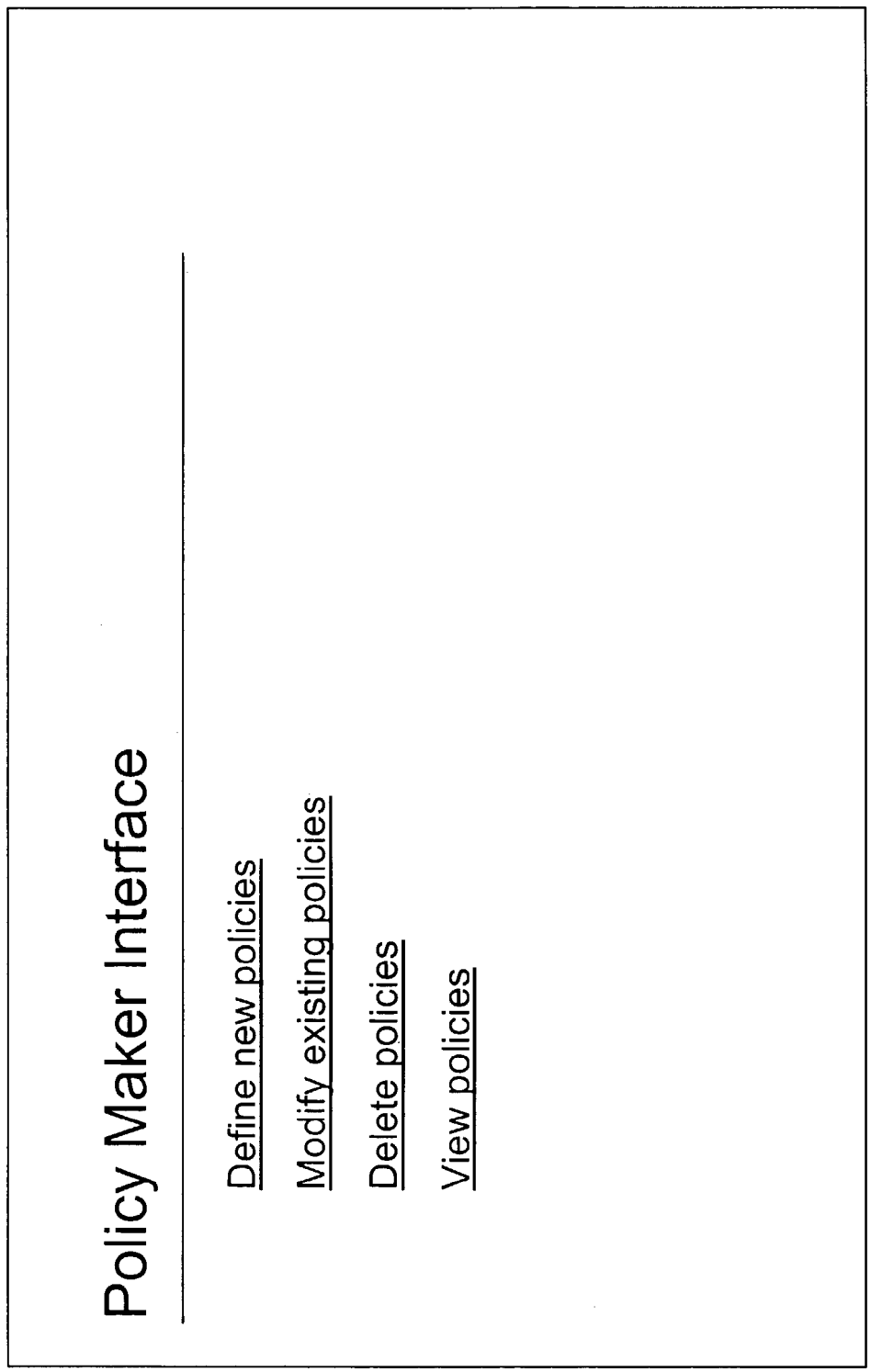
FIG. 6 shows a GUI for a policy maker interface in accordance with a preferred embodiment of the current invention.
Figure 8:
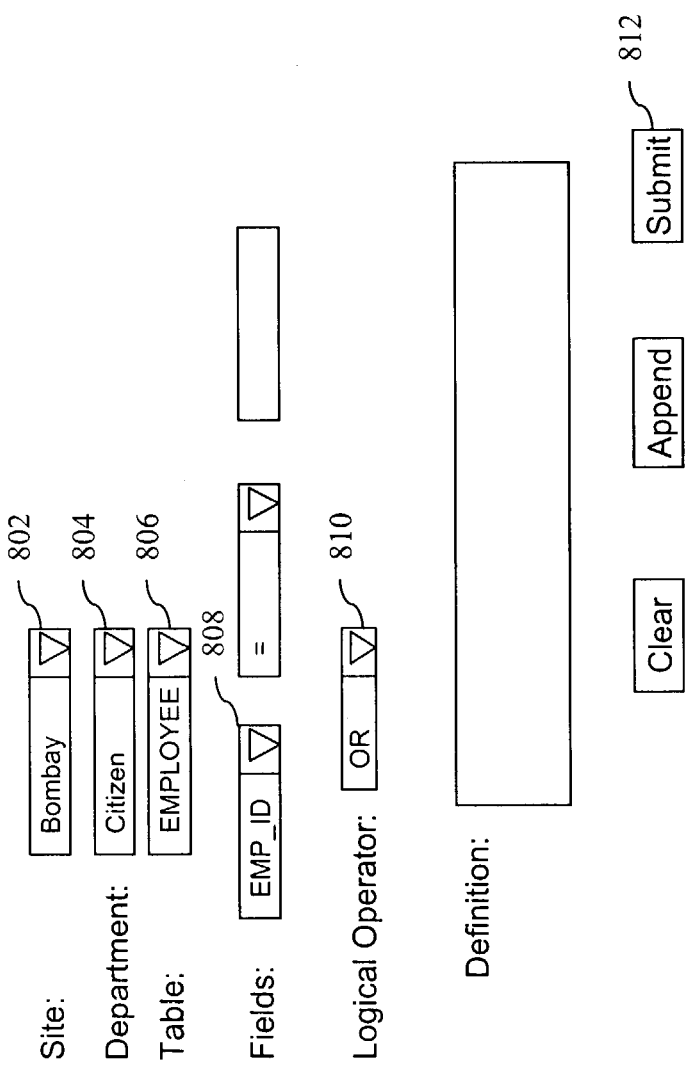
FIG. 8 shows a GUI for specifying conditions in accordance with a preferred embodiment of the current invention.

FIGS. 7–9 depict the examples of different GUIs displayed to the user on selection of the option "Define New Policy" from GUI shown in FIG. 6. FIG. 7 shows an example of GUI for specifying events in accordance with a preferred embodiment of the current invention. For defining an event, a unique event name may be entered in the event specification screen at box 702. If the event name already exists in the policy database, then the GUI prompts the user to check the event name and definition. The type of event is specified in the 'Event Type' drop down box 704. The drop down box can have three types of primitive events, viz., database event, temporal event and external event. Users can create either a new event or use already existing (primitive or composite) events to create a new composite event. A drop down list of the databases, tables and fields, according to the access privileges, along with allowed operations are shown to the policy creator in order to specify the location of occurrence of the event. Once the user has filled the required parameters and clicked on the submit button 706, the event definition is temporarily cached and the condition screen GUI, as shown in FIG. 8, is displayed to the user.

In condition screen GUI, shown in FIG. 8, the user can specify the database site (i.e., where the condition needs to be checked) in box 802, department (owner of the database) in box 804, table (name of the table on which the condition is to be tested) in box 806, the field whose value needs to be checked in box 808 and the specific binary operator in box 810 and comparison value. Using the operators, a composite condition can be formed. On clicking the submit button 812, the condition is stored in a temporary session variable while the server provides the user with the action specification screen as shown in FIG. 9.

The action specification screen, as shown in FIG. 9, show four types of actions that can be required in order to manage data, namely notification, purge, archive or database action. Database action can further be classified as insert, delete or update. Notification action sends a notification (such as an e-mail or instant message) to an external system. This notification can be used to trigger action on the external system. Purge action purges the records from the database while archive action removes the records from the main memory and backs it up in a secondary storage. Database actions include insertion, deletion and updating. Each action takes a fixed set of parameters and is appended to the action string. Once the action string is submitted, the complete definition of the policy is displayed to the user in action specification box 902. The user can confirm a policy by pressing the submit hyperlink 904. The user can optionally change the definition of any component (i.e., event, condition or action), prior to submitting a policy by clicking append hyperlink 906.

Once policy artifacts are defined through GUIs shown in FIGS. 7–9, they are passed to the policy translator. The policy translator comprises of a tokenizer and a parser. The tokenizer extracts the tokens used in the policy definitions. The output from the tokenizer is put into the parser, which takes the tokens and converts them into XML format. Thereafter it applies a set of rules (production rules) to interpret the meaning and check the validity of the policy definition. For validating a policy definition, i.e. checking whether the syntax of policy definition is correct, the parser can use predefined production rules associated with defining a policy. One way in which this can be done is by defining appropriate Document Type Definitions (DTDs). DTDs are a kind of syntactic and semantic rules, and can be used to validate policy definition in XML format.

The XML output is then passed to conflict detector, which checks the policy for conflicts with existing policies in the policy database. In case a conflict is detected, and it cannot be resolved through meta-policies, the system returns an error message to the user. If no conflict is detected (or if the conflict has been resolved using meta-policies in the policy database), the policy deployment engine converts the conflict-free policy (in XML format) to relational format using appropriate converter, and stores it in the policy database. Standard system language, such as Structured Query Language (SQL), Data Definition Language (DDL), Data Manipulation Language (DML) etc. can be used as for adding the policy in policy database.

The policy is stored in relational format under two tables, namely event table and rule table, in policy database. Each type of event (i.e., primitive, composite or temporal) is stored in different event table. The schemas of each of them are shown in Tables 1, 2 and 3.

TABLE 1

Primitive Event Table Schema

| Event ID | Integer |
|---|---|
| Creation Time | Var Char |
| Event Name | Var Char |
| Event Type | Var Char |
| Event Owner | Var Char |
| Database Name | Var Char |
| Table Name | Var Char |

TABLE 2

Composite Event Table Schema

| Event ID | Integer |
|---|---|
| Creation Time | Var Char |
| Event Name | Var Char |
| Event Owner | Var Char |
| Primitive Event Name | Var Char |
| Operator | Var Char |
| Next ID | Integer |

TABLE 3

Temporal Event Table Schema

| Creation Time | Var Char |
|---|---|
| Event Name | Var Char |
| Event Type | Var Char |
| Event Owner | Var Char |
| Starting Time | Var Char |
| Event Occurrence Time | Var Char |
| Ending Time | Var Char |

Event ID is the system generated event identification number, which in combination with Event Name makes the primary key. Creation time is the event creation time. Event Type indicates the type of operation the event is about to perform, namely Insert, Update or Delete. Event owner stores the name of the creator who has created the policies. In composite event table schema (Table 2), primitive event name denotes the name of the primitive events, which form a part of the composite event tree. Operator denotes the name of the operator by which the corresponding primitive event is connected by the event shown by Next ID.

In a temporal event table schema (Table 3), creation time is stored as a string in the second/minute/hour/day/date/month/year format. Event type indicates whether it is an absolute event or a periodic event. Starting time is the time when the detection of a relative or a periodic event starts; this entry is null if the event is an absolute event. Event occurrence time denotes the period/interval, in case of periodic events, after which the event will recur. Stop time is the time whence the periodic event will stop occurring.

Once a policy has been specified, the condition and action part need to be stored in the rule table as shown in Tables 4 and 5 to completely specify the rule definition. The action string is in the form of SQL, DDL, DML statements, which can be taken by the query processor at the Resource Abstraction and Notification layer, in order to execute the actions.

TABLE 4

Schema of the rule table

| Rule Name | Var Char |
|---|---|
| Rule Creation Time | Var Char |
| Event Name | Var Char |
| Condition String | Var Char |
| Action String | Var Char |
| Class Name | Var Char |

TABLE 5

Example of an entry in the rule table

| Rule Name | Rule Creation | Event Name | Condition String | Action String | Class Name |
|---|---|---|---|---|---|
| Rule 1 | 10/07/10/Th/22/11/2001 | Primitive.e1 | Cond_str | Act_str | ActionDbClass |

Note that the above scheme of storing policies in policy database is one illustrative scheme. It will be obvious to one skilled in the art that various other schemes may also be used for deploying the policies.

Figure 10:
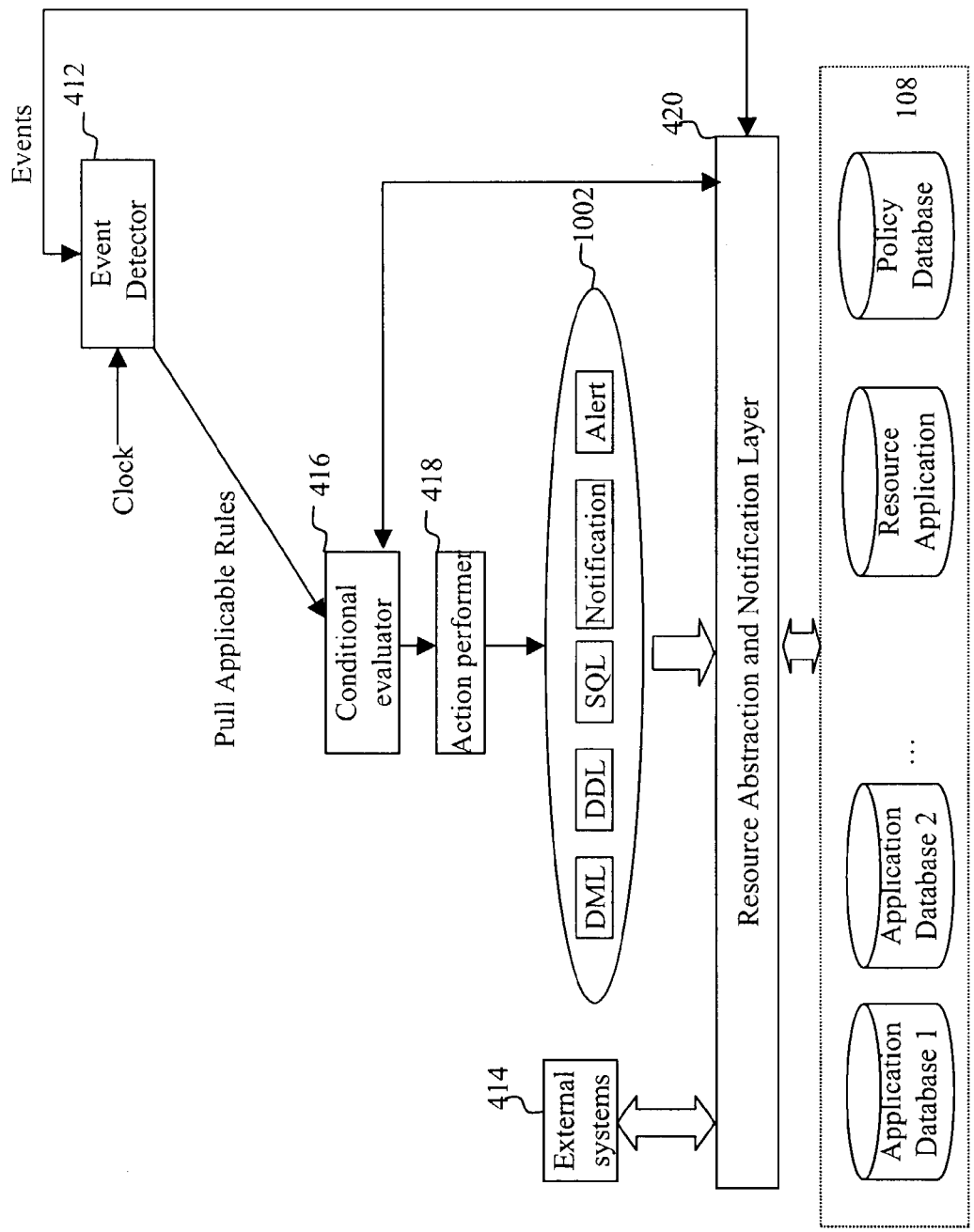
FIG. 10 illustrates a manner of execution of policies in accordance with a preferred embodiment of the current invention.

Now we describe how a deployed policy is executed upon occurrence of an event using FIG. 10. As described, events that occur may either be temporal events, resource events (such as database events) or external events. Event detector 412 detects these events with the help of Resource Abstraction and Notification Layer 420. One possible way in which the detection can be done is as follows: first, various attributes of the occurred event are identified. These attributes may include event name, event type, time of creation (for temporal events), databases concerned (for database events), etc. Note that any set of event attributes may be used to identify an event that is stored in an event table in policy database 108. The next step involves identifying the relevant events in the event table using the identified attributes of the occurred event. Event Detector 412 listens to Resource Abstraction and Notification Layer 420 for all the events occurring in the system, and checks for the events that are specified in the event table of policy database. Once a relevant event is detected, its identifier (such as event ID) information is sent to condition evaluator 416. Condition evaluator 416 then pulls out all applicable policies (conditions and actions) that are stored in the rule table in policy database 108. It may simply use event ID and get the corresponding condition and action strings from the rule table. Condition evaluator 416 now checks the condition corresponding to each policy. These conditions may relate to external systems as well as to resources, such as system databases. Typically, the conditions are simple logic operations, such as comparison of two values that characterize an external system or an internal system (such as a database). Thus, condition evaluator 416 receives inputs from resources within and outside the system. Condition evaluator may also execute system commands (for e.g. using SQL query), in order to evaluate a condition (for e.g. to check the status of resource). After condition evaluation, condition evaluator 416 either rejects the rule (if the condition is not true), or passes the action part of the rule to action performer 418 (if the condition is true).

Action performer 418 controls a set of action components 1002. These action components may be in the form of DML (Data Manipulation Language), DDL (Data Definition Language), SQL (Structured Query Language), Notification and Alert. Action performer 418 sends appropriate instructions to the resource (which has to perform the action) via resource abstraction layer 420 in order to execute actions defined in the policy. For instance, it may send a SQL instruction to DBMS (Database Management System) via resource abstraction layer 420.

Having explained the system and method of managing resources in accordance with a preferred embodiment of the present invention, we now take an example of a policy and show the manner in which policy is created and processed in a preferred embodiment of the current invention. This will help in explaining the heretofore-described system and method more clearly.

EXAMPLE

The invention will hereinafter be illustrated with the help of an example.

Consider the example of a policy "(Event) On first day of every month, starting from January-2002 to January-2005, at 9:00 am, (Condition) check if the size of the DELHI:EBIZ database is greater than 200 MB, then (Action) take a backup of the database on the Delhi Backup servers, namely DELHI_EBIZ, on tape". The user can define this policy in an intuitive manner (using simple language constructs) through GUIs, as shown by FIGS. 11–14. The user can specify the event, condition and actions through drop-down menus and clickable tabs. FIGS. 11 and 12 illustrates a GUI used for Event Specification. In FIG. 11, the user specifies event name and type of event (temporal). In FIG. 12, the user further defines the values in temporal event. FIGS. 13 and 14 illustrate GUIs used for specifying conditions and actions respectively.

The policy definition layer captures the user selections through the GUIs. By simple preprocessing, the selections made by the user are arranged in the following format:

Event: (New_Temporal) (Starting From (2002-Jan-1 1:00) On EveryMonth On Date1 Start At 9:00 End At (2005-Jan-1 1:00))

Conditions: (database_state Size_of_database(DELHI:E-BIZ)>200 MB)

Action: [(Backup Database: DELHI:EBIZ At DELHI:Tape As Backup_EBIZ )]

It may be noted that these values can also be optionally shown in the GUI to the user, who can also append these values directly (without selecting appropriate clickable tabs or dropdown menus) to further customize and define complex policies. Illustrations of these definition boxes, where the user can visualize and modify the definitions are shown in GUIs in FIGS. 12–14.

The above format of the specified Event, Condition and Action are passed to the policy translator. The policy translator comprises of a tokenizer and a parser. The tokenizer extracts the tokens used in the above definitions. In the above example the tokenizer returns the following tokens for event definition:

LEFT_BRACKET NEW_TEMPORAL RIGHT_BRACKET LEFT_BRACKET STARTING STRING LEFT_BRACKET STRING RIGHT_BRACKET STRING EVERY MONTH STRING DATE NUMBER START AT STRING END AT LEFT_BRACKET STRING RIGHT_BRACKET RIGHT BRACKET

The output from the tokenizer is put into the parser, which takes the tokens and converts them into XML format. In the above example, the event definition in XML format can look like the following:

```
<temporal_event>
    <temporal_event_id="1"/>
    <event_name>New_temp</event_name>
    <event_type>relative</event_type>
    <event_owner>db2admin</event_owner>
    <creation_time_stamp>2:49:22:Sat:5:Oct:2001</creation_
        time_stamp>
    <start_event>2002:jan:1:9:00</start_event>
    <period_unit>months</ period_unit>
    <sub_period>9:00</sub_period>
    <periodicity>Month:1</ periodicity>
    <sub_period_unit>t</sub_period_unit>
    <next_occurence>2002:Feb:1:9:00</ next_occurence>
<temporal_event>
```

Thereafter the parser applies a set of rules (production rules) to interpret the meaning and check the validity of the policy definition. For validating a policy, i.e. checking whether the syntax of policy definition is correct, the parser can use predefined production rules associated with defining a policy. One way in which this can be done is by defining appropriate Document Type Definitions (DTDs). DTDs are a kind of syntactic and semantic rules, and can be used to validate policy definition in XML format.

The above XML output is then passed to the conflict detector, which checks the policy for conflicts with existing policies in the policy database. If no conflict is detected, the policy deployment engine stores the conflict-free policy in policy database in relational format. Standard system language, such as Structured Query Language (SQL), Data Definition Language (DDL), Data Manipulation Language (DML) etc. can be used for adding the policy in policy database. One example of SQL query is INSERT INTO TemporalEvents VALUES (1, 'New_temp', 'Relative', 'db2admin', '2:49:22:Sat:5:Oct:2002', '2002:Jan:1:9:00', '2005:Jan:1:9:00', 'months', '9:00', 'Month:1', 't', '2002:Feb:1:9:00')

The policy is stored in relational format under two tables, namely event table and rule table, in policy database. In the above example, the entry in the policy database in relational format can be following:

| | |
|---|---|
| Event Table: | |
| EVENT_ID: | 1 |
| EVENT_NAME: | New_temp |
| EVENT_TYPE: | Relative |
| EVENT_OWNER: | db2admin |
| CREATION_TIME: | 2:49:22:Sat:5:Oct:2002 |
| START_EVENT: | 2002:Jan:1:9:00 |
| END_EVENT: | 2005:Jan:1:9:00 |
| PERIOD_UNIT: | months |
| SUB_PERIOD: | 9:00 |
| PERIODICITY: | Month:1 |
| SUB_PERIOD_UNIT: | t |
| NEXT_OCCURENCE: | 2002: Feb: 1:9:00 |
| Rule Table: | |
| RULE_ID: | 2 |
| RULE_NAME: | New_temporal |
| EVENT_ID: | 1 |
| CONDITION_STRING: | (database_state Size_of_ database (DELHI:EBIZ) < 200 MB) |
| ACTION_STRING: | [(Backup Database: DELHI_EBIZ At DELHI: Tape As Backup_EBIZ)] |
| RULE_TYPE: | TEMPORAL |
| RULE_OWNER: | DB2ADMIN |
| CREATION_TIME: | 3:49:22:Sat:5:Oct:2002 |

The execution of the above policy can happen in the following manner. The event detector senses Resources Abstraction and Notification Layer for events. In case, the event detector detects an event, which is already defined in event table of policy database, it extracts the corresponding policy definitions from the policy database. In the above example, when the event occurs (namely temporal event defined by 9:00 AM, Jan. 1, 2002), then conditions and action definitions are retrieved from the rule table using the event information (such as event ID, creation time, etc.). The rule string (includes the condition and action) corresponding to the event is passed to condition evaluator. In order to verify the condition, the condition handler may form and execute appropriate commands. In the above example, where condition string is—"If size of database DELHI:EBIZ is greater than 200 MB", condition evaluator may determine the size of DELHI:EBIZ database by appropriate SQL commands. In the above example, the size of all tables of a database can be extracted by SQL query—"list tablespaces show detail". The sum of the list of used pages gives the estimate of the size of the database.

The size obtained by the result of the SQL query, is compared with the threshold value (defined in the condition string), namely 200 MB. If the size is less than 200 MB, the condition evaluator looks for other rules defined in the condition sting, and validates them in the same manner as described above. If there are no other rules defined in the string, the condition evaluator closes the database connection and quits.

In case the condition is true, i.e. size is greater than 200 MB, the condition evaluator passes the action string to action performer. The action handler interprets the action string (with its own parser), and forms appropriate SQL query. The SQL query is then passed to a query processor at the Resource Abstraction and Notification layer, to execute the defined actions. In the current example, an SQL query for backup of DELHI:EBIZ database is sent to the query processor, which is "BACKUP DATABASE DELHI_EBIZ ONLINE TO \\DELHI\\TAPE\\DELHI_EBIZ".

Hardware and Software Implementation

Figure 15:
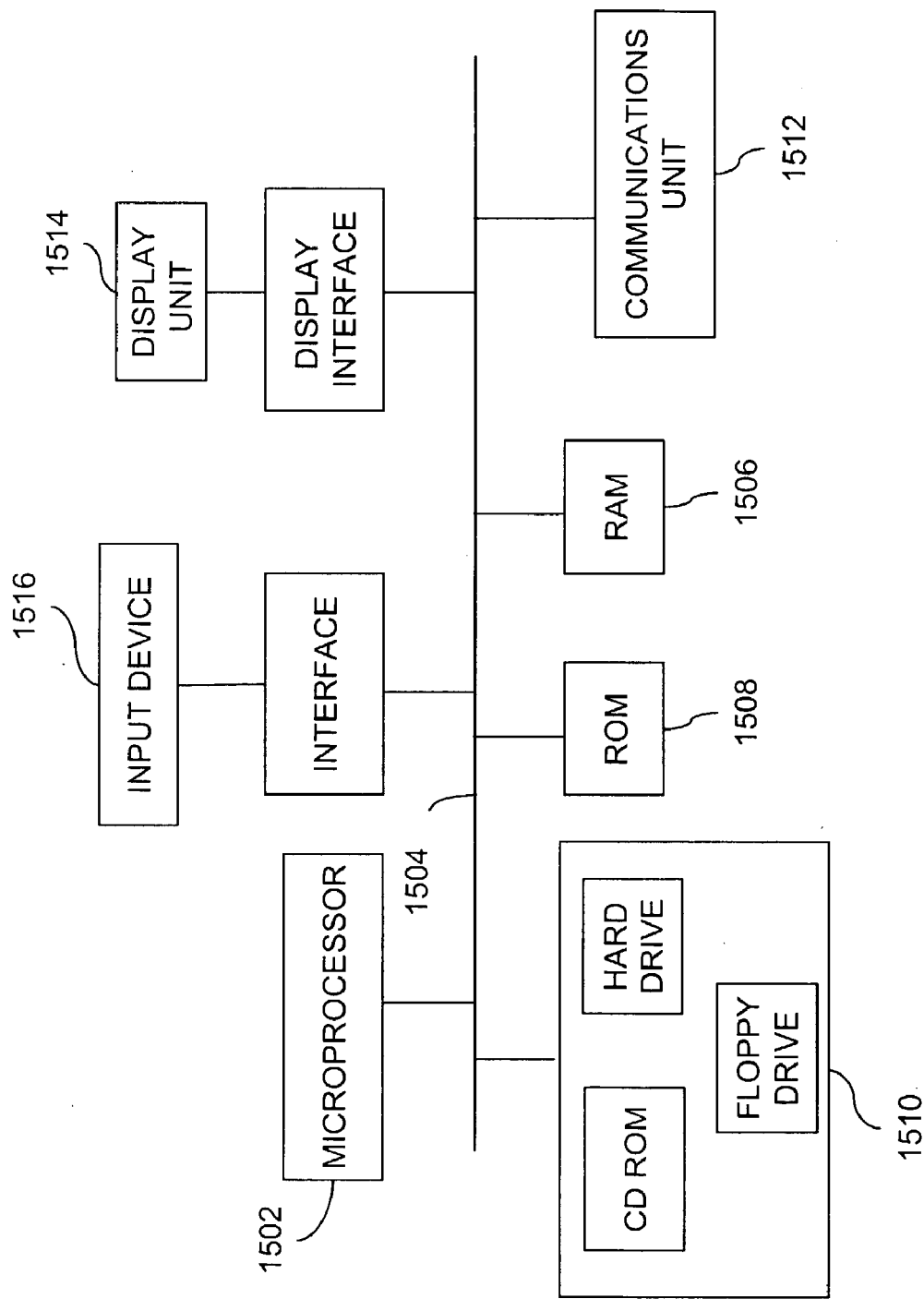
FIG. 15 shows a computer system for implementing the current invention.

The present invention may be implemented in a computer system or any other processing system. One such computer system has been illustrated in FIG. 15. The computer system comprises a microprocessor 1502. The microprocessor is connected to a communication bus 1504. The computer system also includes a Random Access Memory (RAM) 1506, a Read Only Memory (ROM) 1508 and secondary memory 1510. Secondary memory 1510 can be a hard disk drive or a removable storage drive such as a floppy disk drive, optical disk drive etc. Secondary memory 1510 can also be other similar means for loading computer programs or other instructions into the computer system. The computer system also includes a communication unit 1512. Communication unit 1512 allows the computer to connect to other databases and the Internet. Communication unit 1512 allows the transfer as well as reception of data from other databases. Communication unit 1512 may include a modem, an Ethernet card or any similar device, which enables the computer system to connect to databases and networks such as LAN, MAN, WAN and the Internet. The computer system also includes a display unit 1514, for providing a user interface and an input device 1516 to enable the user to input policies.

The preferred embodiment of the current invention can be implemented on systems having certain architectural elements as can be found in the UNIX, Windows 2000 and Windows NT operating systems; more specifically in conjunction with database management systems (DBMS) such as IBM DB2/Common-Server on Risc System/6000. Other relational databases such as Sybase, Oracle etc. can also be used.

The software code for implementing the current invention can be written in any programming language such as C, JAVA, C# etc. The current invention can also be deployed as a web-service. The main back-end blocks can be written as servlets (JAVA programs designed to run on an application server or a servlet engine), while the front-end blocks can be written as JSP (Java Server Pages), HTML, JAVA-Scripts and Applets. The current invention communicates with the back-end databases using JDBC API's.

The current invention provides for several APIs for implementing various aspects of policy definition, policy deployment and policy execution. APIs that can be used in the current invention can be made in any programming language depending on the system on which it is being used. Java™ Enterprise APIs, Java foundation classes (JFC), Swing etc. are some of the tools available in Java™ platform. Some of the important APIs used in various layers have already been discussed above along with the description of layers.

Advantages of the Invention

The present invention offers many advantages. It makes the task of resource management easier. The user-friendly interfaces and simple language constructs can enable even an IT non-expert to define, modify, delete or visualize policies. Therefore, cost of resource and data management is reduced significantly.

Figure 16:
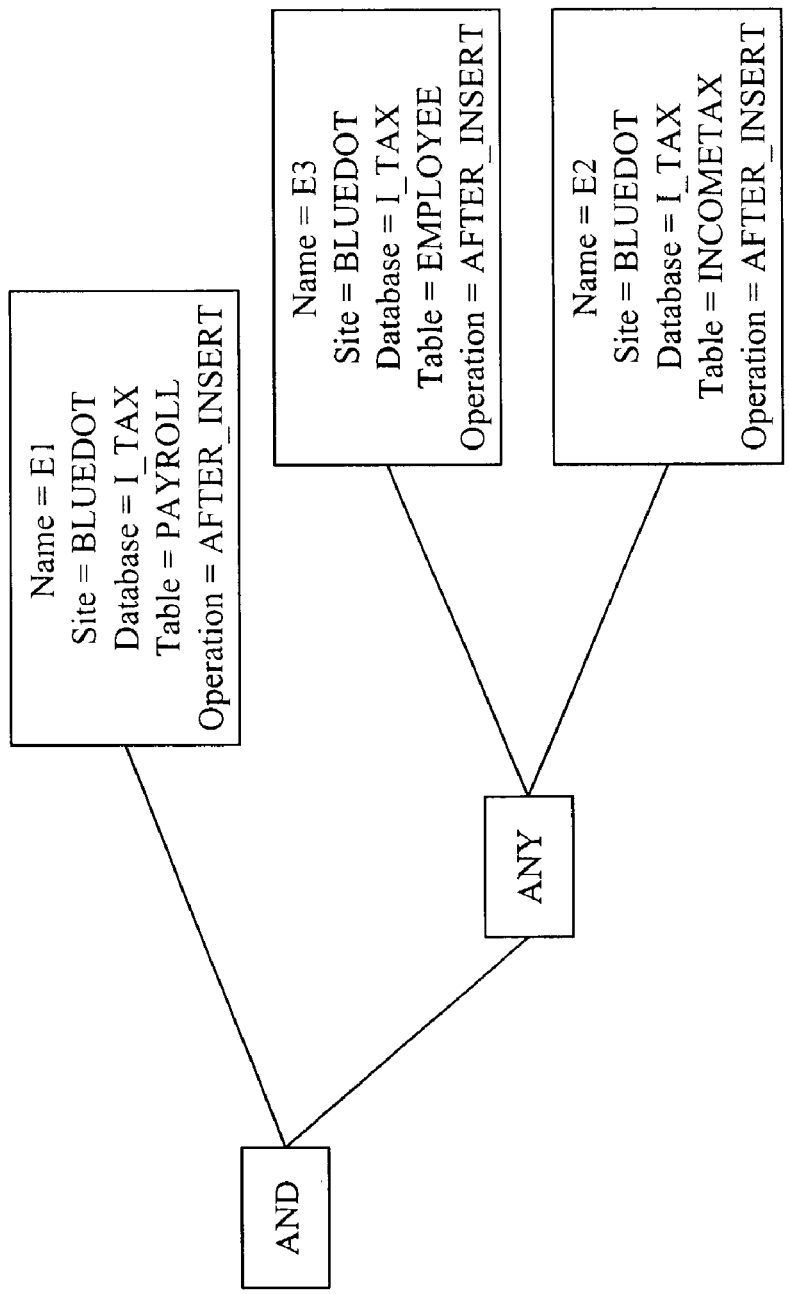
FIG. 16 shows an example of visualizing policies with tree type data structure in accordance with a preferred embodiment of the current invention.

The task of visualizing and understanding the policies in the given system can be represented graphically as trees. The policies to be visualized are retrieved from policy database by policy translator 406 in relational format. Thereafter, the policy translator translates the details regarding policy artifacts in XML format. One skilled in the art will appreciate that the extracted policy details in XML format can be easily converted and embedded in user interfaces, using appropriate software tools. For example, the extracted policy can be shown to the user in a tree type structure, by using XML definitions. FIG. 16 shows an example of visualizing policies with tree type data structure. Event E1 may contain details such as name, site, database, table, operation etc. As illustrated in FIG. 16, event E1 occurs when AFTER_INSERT operation is carried out in PAYROLL table in I_TAX database located at BLUEDOT site. The policy is 'when event E1 and any one of event E2 or event E3 occurs in the income tax database (I_TAX) and condition C1 is satisfied, then perform action A1'. For representing multiple events, connectors such as AND, ANY etc. are used. The conversion of a policy stored in the policy database to a tree type structure is done by the policy translator. As an example, three events are shown in FIG. 16, which are connected by two types of connectors AND and ANY. Thus the policy is activated when E1 as well as any one of E2 and E3 occur. The parameters corresponding to the events are shown in the block shown. The parameters can be name of the event, site name (where the resource is located), name of the database, name of the table, type of operation (insert, delete, update). Similar types of trees are also used to depict the conditions and actions for the defined policy. The tree-based structure is clearly helpful in understanding, visualizing and modifying the policies and their individual artifacts, especially from the point of view of an IT non-expert. It may be apparent to one skilled in the art that there may be several modifications in the way the user visualizes the policies. For example, in an alternative embodiment, the policies may be represented by a textual description in an HTML document.

Another advantage of the present invention is that it provides access control on individual policy artifacts. Through intuitive simple language constructs, a user can define permissions and access control rules for data, resources (e.g. databases, network devices). Further, access control can be configured at event and/or condition and/or action level. The condition clause of a policy can return non-binary value and actions are executed depending on the return value. For example, consider a policy with the event as 'Entry of new item in the stock'. The condition clause of this policy returns a value 1 if the item is general category, value 2 if the item is special category and value 3 if the item is important requested category. There can be different actions defined for each of these return values. For example, if the return value is 1 or 2 then the system may notify the sales department, and if the return value is 3, then the system can notify the sales department along with the id of the user who requested it and also send a notification to the user who requested it.

Another advantage of the present invention is that it provides a mechanism for detecting conflicts, thereby preserving the integrity of the system. Through the use of meta-policies (containing the priority on the policies and policy creators), it can be determined whether any conflict exists between the new/modified policy and the existing policies. If such a conflict exists then the new/modified policy is rejected and the policy creator is notified about the same. In this manner, only conflict free policies are deployed in the policy database.

Another advantage of the present invention is that it provides centralized access to manage and monitor distributed resources. All resources in the network can be controlled centrally by defining appropriate policies.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system operable for managing resources using a plurality of policies, the policies being stored in a policy database, the policies being defined by events, conditions, and actions, wherein said events comprise temporal and composite events, the system comprising:
   a first device operable for enabling a user to define, modify, delete and visualize the policies in an intuitive manner;
   a second device operable for deploying the policies defined by the user, the second device comprising:
      a converter operable for converting policies defined in an intuitive manner into a meta-language format that can be directly stored in the policy database;
   a third device operable for executing the deployed policies on an occurrence of an event; and
   an interface operable for interfacing the resources with the first device, the second device, and the third device, and wherein said interface is further operable for viewing, updating, deleting, inserting records, and detecting changes in said policy database,
   wherein said policies comprise only conflict-free policies, whereby a conflicting policy comprises defining conflicting actions on the occurrence of a same event and condition occurring,
   wherein meta-policies are used to disallow a simultaneous execution of multiple conflicting policies,
   wherein said policies comprise access control policies relating to specifying access control on data and accessing said resources, and
   wherein said access control policies are defined at each of an event, condition, and action level.

2. The system of claim 1, further comprising a security component operable for authorizing and authenticating users of the system, wherein said security component is operable to categorize administrators of the system to work with different classes of resources and re-use different classes of event, condition, and action definitions from said system.

3. The system of claim 1, wherein the policies comprise conflict-free policies stored in a relational format in the policy database.

4. The system of claim 1, wherein the second device further comprises:
   a unit for resolving conflicts between a newly defined or modified policy and the existing policies; and
   a storage component operable for storing conflict-free policies in the policy database.

5. The system of claim 4, wherein the unit further comprises a plurality of meta-policies, the meta-policies describing precedence among operations on each resource and precedence among policy makers.

6. The system of claim 1, wherein the third device further comprises:
   a first sub-component operable for detecting occurrence of events;
   a second sub-component operable for evaluating conditions corresponding to detected events, the conditions being defined in policies corresponding to the detected event; and
   a third sub-component operable for executing actions corresponding to evaluated conditions, the actions being defined in policies corresponding to the detected events and the evaluated conditions.

7. The system of claim 1, wherein the interface further comprises:
   a monitor operable for monitoring and accessing resources;
   a first sub-unit for handling the conditions; and
   a second sub-unit for handling the actions.

8. The system of claim 7, wherein the monitor enables access of resources to events, conditions and actions.

9. The system of claim 1, wherein the first device further comprises a set of GUIs.

10. The system of claim 1, wherein visualization of policies is presented as a hierarchical tree structure.

11. A method for managing resources using a plurality of policies, the policies being stored in a policy database, the policies being defined by events, conditions, and actions, wherein said events comprise temporal and composite events, the method comprising:
   defining policies in an intuitive manner;
   translating the policies defined in the intuitive manner into a meta-language format that can be directly stored in the policy database;
   validating the defined policies as a conflict free policy;
   deploying only conflict-free policies into the policy database, whereby a conflicting policy comprises defining conflicting actions on the occurrence of a same event and condition occurring, wherein meta-policies are used to disallow a simultaneous execution of multiple conflicting policies;
   interacting with the policies in said policy database, wherein said interacting comprises viewing, updating, deleting, inserting records, and detecting changes in said policy database; executing the policies stored in the policy database, the policies being executed on an occurrence of an event corresponding to the policies,
   wherein said policies comprise access control policies relating to specifying access control on data and accessing said resources, and
   wherein said access control policies are defined at each of an event, condition, and action level.

12. The method of claim 11, wherein the step of validating the defined policies further comprises notifying a policy creator about a policy conflicting with the existing policies.

13. The method of claim 11, wherein the step of executing the policies comprises:
   detecting occurrence of events in the system;
   extracting the policies corresponding to detected events from the policy database;
   evaluating the conditions defined in the extracted policy; and
   executing the actions defined in the extracted policy based on the evaluated conditions.

14. The method of claim 11, wherein the policies are defined in the intuitive manner using GUIs.

15. A system operable for managing resources using a plurality of policies, the policies being stored in a policy database, the policies being defined by events, conditions, and actions, wherein said events comprise temporal and composite events, the system comprising:
   a plurality of client machines that enable a user to define, modify, and visualize policies in an intuitive manner;
   a server connected to each of the client machines, the server comprising:
      a first device operable for deploying the created policies, the first device comprising a converter operable for converting policies defined in an intuitive manner into conflict-free policies defined in a relational query format a meta-language format that can be directly stored in the policy database;
      a second device operable for executing the deployed policies on an occurrence of an event; and
      an interface operable for interfacing resources with the plurality of client machines, the converter, the first device, and the second device, and wherein said interface is further operable for viewing, updating, deleting, inserting records, and detecting changes in said policy database,
   wherein said policies comprise only conflict-free policies, whereby a conflicting policy comprises defining conflicting actions on the occurrence of a same event and condition ocurring,
   wherein meta-policies are used to disallow a simultaneous execution of multiple conflicting policies,
   wherein said policies comprise access control policies relating to specifying access control on data and accessing said resources, and
   wherein said access control policies are defined at each of an event, condition, and action level.

16. The system of claim 15, wherein the policy database further comprises:
   a first storage unit operable for staring information about events; and
   a second storage unit operable for storing conditions and subsequent actions for each event.

17. A policy based system for managing resources using a plurality of policies, the policies being stored in a policy database, the policies being defined by events, conditions, and actions, wherein said events comprise temporal and composite events, the system having a plurality of client machines that enable a user to define, modify, and visualize policies in an intuitive manner, the system further comprising:
   a server connected to each of the plurality of client machines, the server comprising:
      a first unit operable for deploying created policies, the first unit comprising a converter operable for convening policies comprising conflict-free policies defined in an intuitive manner into a format that can be directly stored in a policy database;
      a second unit operable for executing deployed policies on an occurrence of an event, wherein execution of policies resulting in management of resources; and
      an interface operable for interfacing resources with the first unit and the second unit, the resources including a policy database that stores the deployed policies in a relational format, and wherein said interface is further operable for viewing, updating, deleting, inserting records, and detecting changes in said policy database,
   wherein said policies comprise only conflict-free policies, whereby a conflicting policy comprises defining conflicting actions on the occurrence of a same event and condition occurring,
   wherein meta-policies are used to disallow a simultaneous execution of multiple conflicting policies,
   wherein said policies comprise access control policies relating to specifying access control on data and accessing said resources, and
   wherein said access control policies are defined at each of an event, condition, and action level.

18. A policy based system operable for managing a plurality of resources, the system including a server connected to a plurality of client machines, the server including a first device operable for deploying policies in a policy database, the policies being deployed on an occurrence of an event, the policies being defined by events, conditions, and actions, wherein said events comprise temporal and composite events, the first device including a converter operable for converting policies defined in an intuitive manner into policies comprising conflict-free policies defined in a relational meta-language format, wherein each of the client machines comprises:

a first component operable for enabling a user to define, modify and visualize policies in the intuitive manner, wherein the first component comprises:

a plurality of user interfaces for taking commands and data from the user, wherein one of said plurality of user interfaces is operable for viewing, updating, deleting, inserting records, and detecting changes in said policy database; and a unit operable for mapping a predefined set of system commands to the plurality of user interfaces, wherein one system command maps to at least one user interface;

a second component operable for exchanging information with a server in order to define, modify, and visualize policies, wherein said policies comprise only conflict-free policies, whereby a conflicting policy comprises defining conflicting actions on the occurrence of a same event and condition occurring, wherein meta-policies are used to disallow a simultaneous execution of multiple conflicting policies, wherein said policies comprise access control policies relating to specifying access control on data and accessing said resources, and wherein said access control policies are defined at each of an event, condition, and action level.

19. A system operable for managing resources using a plurality of policies, the resources including a plurality of databases, the policies being defined by events, conditions, and actions, wherein said events comprise temporal and composite events, the policies including record retention policies for managing resources, the policies including access control policies for controlling access on said resources, the system comprising:

a first component operable for enabling a user to define, modify, delete, and visualize the policies in an intuitive manner;

a second component operable for deploying the policies defined by the user, the second component comprising:

a converter operable for converting policies defined in the intuitive manner into conflict-free policies defined in a relational meta-language query format;

a third component operable for executing deployed policies on an occurrence of an event; and a fourth component operable for interfacing the resources with the first component, the second component, and the third component, and wherein said fourth component is further operable for viewing, updating deleting, inserting records, and detecting changes in said policy database, wherein said policies comprise only conflict-free policies, whereby a conflicting policy comprises defining conflicting actions on the occurrence of a same event and condition occurring, wherein meta-policies are used to disallow a simultaneous execution of multiple conflicting policies, and wherein said access control policies are defined at each of an event, condition, and action level.

20. The system of claim 19, wherein said access control policies specify access control on data.

21. A computer program product for performing a method for managing resources using a plurality of policies, the policies being stored in a policy database, the policies being defined by events, conditions, and actions, wherein said events comprise temporal and composite events, the method comprising:

enabling a user to define, modify, delete, and visualize the policies in an intuitive manner;

deploying the policies defined by the user, further comprising:

converting conflict-free policies defined in the intuitive manner into a meta-language format that can be directly stored in the policy database;

executing deployed policies on an occurrence of an event; and interfacing the resources with the user, wherein said interfacing comprises interacting with the policies in said policy database, wherein said interacting comprises viewing, updating, deleting, inserting records, and detecting changes in said policy database, wherein said policies comprise only conflict-free policies, whereby a conflicting policy comprises defining conflicting actions on the occurrence of a same event and condition occurring, wherein meta-policies are used to disallow a simultaneous execution of multiple conflicting policies, wherein said policies comprise access control policies relating to specifying access control on data and accessing said resources, and wherein said access control policies are defined at each of an event, condition, and action level.

22. The computer program product of claim 21, wherein said method further comprises:

detecting an occurrence of events;

evaluating conditions corresponding to detected events, the conditions being defined in policies corresponding to the detected events; and executing actions corresponding to evaluated conditions, the actions being defined in policies corresponding to the detected events and the evaluated conditions.

* * * * *